June 26, 1928.

O. P. NYSTROM ET AL 1,674,735

WARM AIR FURNACE

Filed Oct. 24, 1927

INVENTOR
Oscar P. Nystrom
John P. Kolla
BY
Chappell & Earl
ATTORNEYS

Patented June 26, 1928.

1,674,735

UNITED STATES PATENT OFFICE.

OSCAR P. NYSTROM AND JOHN P. KOLLA, OF HOLLAND, MICHIGAN, ASSIGNORS TO HOLLAND FURNACE COMPANY, OF HOLLAND, MICHIGAN.

WARM-AIR FURNACE.

Application filed October 24, 1927. Serial No. 228,291.

The object of the invention is to improve the main casting of the furnace and particularly the joint between the fire pot and the combustion chamber or between sections of the fire pot or combustion chamber.

The main object is to provide a perfectly tight joint at this point to prevent contamination of the warm air by the escape of the products of combustion.

Objects relating to details of the construction will definitely appear from the description to follow.

We accomplish the objects of our invention by the devices and means described in the following specification. The invention is clearly defined and pointed out in the claims.

A device embodying our inveniton is clearly illustrated in the accompanying drawing forming a part of this specification, in which.

Figure 1:
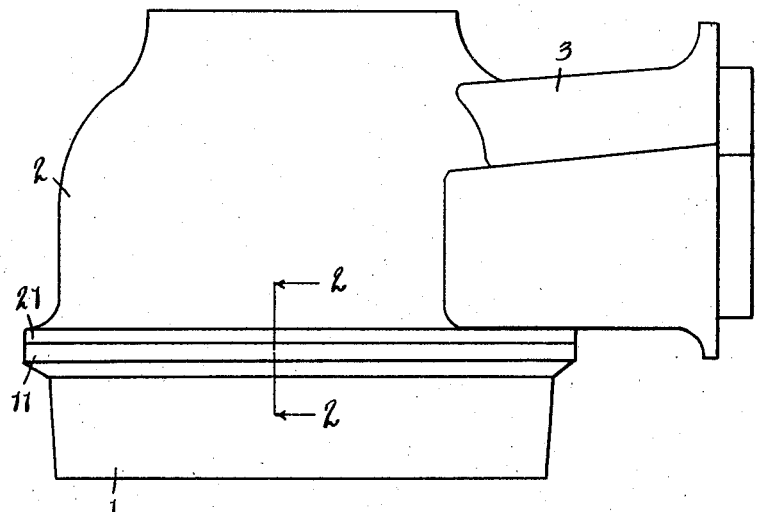
Fig. 1 is an elevational view of the fire pot and combustion chamber of a furnace provided with our improved joint.
Figure 2:
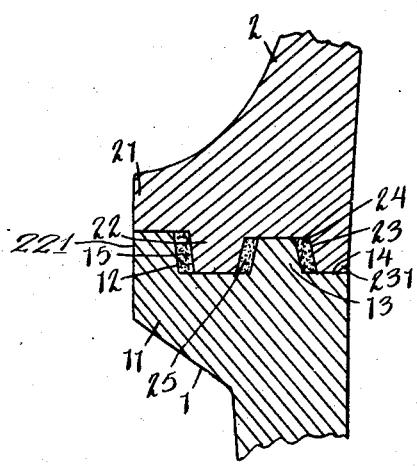
Fig. 2 is an enlarged detail sectional view taken on line 2—2 of Fig. 1 showing the joint structure.

Parts will be identified by their numerals of reference which are the same in all the views.

1 is the fire pot. 2 is the combustion chamber, with the usual feed door casing 3 at one side. The castings are flanged outwardly at 11 and 21 at the joint. 12 is an annular trough or groove formed toward the periphery of the fire pot joint flange 11. 13 is an annular projecting rib forming the inner wall within said trough or groove 12 and 14 is the inner annular joint shoulder formed on the said fire pot casting 1 within the said annular rib 13.

The combustion chamber section is provided with an annular rib 22 corresponding to and adapted to project into trough 12 and is provided with an outer annular contacting shoulder 221 outside the rib 22 and adapted to cooperate with the upper face of the outer annular wall of groove 12.

23 is an annular groove in the under surface of the top member or combustion chamber casting 2. Its outer wall is formed by circular rib 22 and its inner wall 231 extends down into contact with shoulder 14. The annular ribs are considerably smaller in cross section than the said corresponding annular grooves, permitting complete and effective adjustment to secure the alignment of the parts at the inside. Cement is interposed in the joint at 24 25 in the groove 23 and at 15 in the groove 12. The cement is of a consistency to serve as a packing material. There are thus three complete packing rings interposed in this joint, which practically insures perfect fit of the parts and the effective retention of the gases of combustion. This joint is adaptable to be used in the rings of a fire pot where the same is made up of sections.

We desire to claim the invention broadly and also specifically as pointed out in the appended claims.

Having thus described our invention what we claim as new and desire to secure by Letters Patent is:

1. In a fire pot construction for furnaces, the combination of sections, each of which is flanged outwardly and the bottom member of which is formed with an annular trough or groove toward its periphery, a projecting annular rib forming the inner wall of the groove and having an inner annular shoulder within said annular rib, the top member formed with an annular groove of less diameter than the groove of the bottom casting and with a projecting annular rib outside the same corresponding to the annular trough or groove in the said bottom part, and with an outer projecting annular shoulder to cooperate with the outer wall of the bottom member groove, cementitious packing material disposed between the walls of the said ribs and the said trough or grooves, forming three successive packing rings, as specified.

2. In a structure of the class described, made up of sections, a joint made up of corresponding annular trough grooves on the opposed parts and corresponding projecting annular ribs opposed to said troughs or grooves and cooperating therewith, the same being provided with annular contact shoulders on the inner part of the lower member and on the outer part of the upper member, and cementitious packing material in said joint grooves as specified.

In witness whereof we have hereunto set our hands.

OSCAR P. NYSTROM.
JOHN P. KOLLA.